United States Patent
Matsui

(10) Patent No.: US 11,007,890 B2
(45) Date of Patent: May 18, 2021

(54) VEHICLE CHARGE/DISCHARGE DEVICE WITH A REVERSIBLE CABLE COVER

(71) Applicant: Mitsubishi Electric Corporation, Tokyo (JP)

(72) Inventor: Tomomi Matsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/609,688

(22) PCT Filed: Feb. 12, 2019

(86) PCT No.: PCT/JP2019/004824
§ 371 (c)(1),
(2) Date: Oct. 30, 2019

(87) PCT Pub. No.: WO2020/165936
PCT Pub. Date: Aug. 20, 2020

(65) Prior Publication Data
US 2020/0384870 A1    Dec. 10, 2020

(51) Int. Cl.
*B60L 53/16*    (2019.01)
*B60L 53/18*    (2019.01)

(52) U.S. Cl.
CPC ............... *B60L 53/16* (2019.02); *B60L 53/18* (2019.02)

(58) Field of Classification Search
CPC ........... B60L 53/14; B60L 53/16; B60L 53/18
See application file for complete search history.

(56) References Cited

U.S. PATENT DOCUMENTS

| 2013/0069588 A1* | 3/2013 | Oda ................. B60L 53/18 320/109 |
| 2013/0148280 A1* | 6/2013 | Takeno .................. H05K 5/02 361/679.01 |
| 2014/0239887 A1 | 8/2014 | Hamada et al. |

FOREIGN PATENT DOCUMENTS

| DE | 20 2017 102 790 U1 | 8/2017 |
| JP | 2012-55076 A | 3/2012 |
| JP | 2013-85368 A | 5/2013 |
| JP | 2013-192387 A | 9/2013 |
| JP | 2014-180122 A | 9/2014 |
| JP | 2014180122 A * | 9/2014 |

(Continued)

OTHER PUBLICATIONS

German Office Action for German Application No. 11 2019 000 083.7, dated Sep. 10, 2020, with English translation.

*Primary Examiner* — David V Henze-Gongola
(74) *Attorney, Agent, or Firm* — Birch, Stewart, Kolasch & Birch, LLP

(57) ABSTRACT

The vehicle charge/discharge device includes a housing, a cable to serve as a charge/discharge path between a storage battery of an electrically-driven vehicle and an electronic circuit part provided in the housing, a first cable outlet provided in the housing to allow the cable connected to the electronic circuit part to pass therethrough, a cable cover having an elongated shape extending in a horizontal direction, being attached to the housing to cover the first cable outlet, and being attachable to the housing even when left and right in front view are reversed, and the second cable outlet provided on either a left-area surface or a right-area surface of the cable cover in front view to allow the cable provided to pass through the first cable outlet from the electronic circuit part to pass therethrough.

15 Claims, 6 Drawing Sheets

(56) References Cited

FOREIGN PATENT DOCUMENTS

| JP | 2016-187257 A | 10/2016 |
| JP | 2017-28840 A | 10/2016 |

* cited by examiner

VEHICLE CHARGE/DISCHARGE DEVICE WITH A REVERSIBLE CABLE COVER

FIELD

The present invention relates to a vehicle charge/discharge device.

BACKGROUND

In a conventional vehicle charge device, when a user parks a vehicle on an opposite side to a cable outlet of the vehicle charge device, it is necessary to lay a charging cable to cross in front of the vehicle charge device, and the user steps over the charging cable every time the user performs an operation. Therefore, there is a risk in that the user's leg is caught on the charging cable and the user stumbles.

Accordingly, Patent Literature 1, for example, discloses a technique of providing a cable outlet on at least two of housing-vertical wall surfaces so that the direction of the cable outlet can be changed in accordance with the direction of a power-transfer port of a vehicle even if the vehicle is parked on an opposite side to the cable outlet.

CITATION LIST

Patent Literature

Japanese Patent Application Laid-open No. 2014-180122

SUMMARY

Technical Problem

In the conventional vehicle charge/discharge device, however, it is necessary to change the position of a guide roller when the cable outlet is changed, and therefore a workload during an assembly work is high.

The present invention has been achieved in view of the above problems, and an object of the present invention is to provide a vehicle charge/discharge device in which the direction of a second cable outlet can be changed easily.

Solution to Problem

A vehicle charge/discharge device according to an aspect of the present invention, includes: a housing; a cable to serve as a charge/discharge path between a storage battery of an electrically-driven vehicle and an electronic circuit part provided in the housing; a first cable outlet provided in the housing to allow the cable connected to the electronic circuit part to pass therethrough; a cable cover having an elongated shape extending in a horizontal direction, being attached to the housing to cover the first cable outlet, and being attachable to the housing even when left and right in front view are reversed; and a second cable outlet provided on either a left-area surface or a right-area surface of the cable cover in front view to allow the cable which is provided to pass through the first cable outlet from the electronic circuit part, to pass therethrough.

Advantageous Effects of Invention

The vehicle charge/discharge device according to the present invention is provided with a cable cover having a second cable outlet in such a manner that the cable cover can be attached to a housing to face either left or right in front view, thereby allowing easy change of a pull-out direction of a cable.

DESCRIPTION OF EMBODIMENTS

First Embodiment

Figure 1:
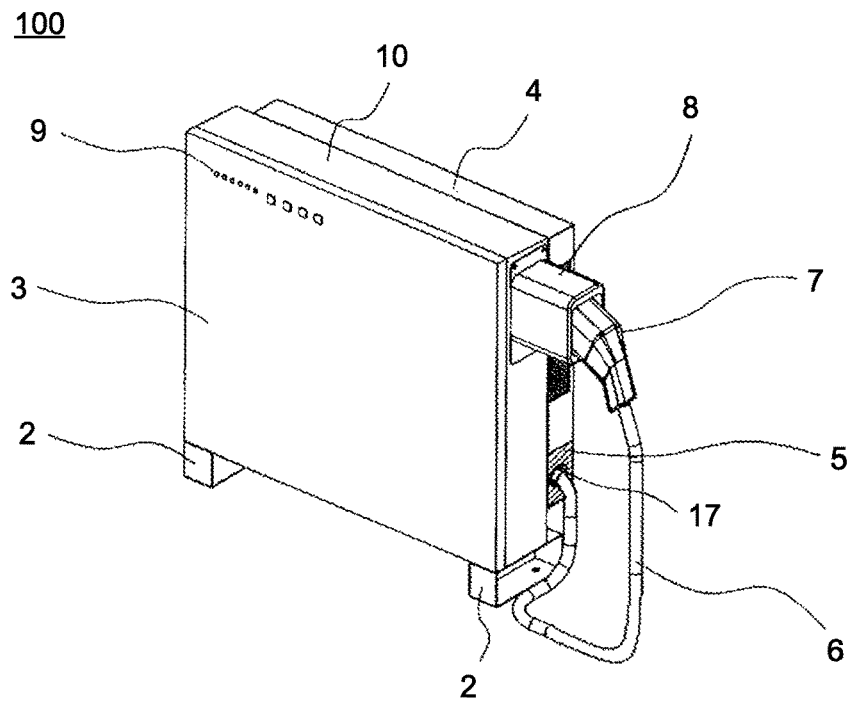
FIG. 1 is a front perspective view of a vehicle charge/discharge device according to a first embodiment of the present invention.

A configuration of a vehicle charge/discharge device according to a first embodiment of the present invention is described. In FIG. 1, a vehicle charge/discharge device 100 includes a housing 10 in a box-shape, bottom bases 2, a front panel 3, a rear cover 4, a cable cover 5, a cable 6, a connector 7, a connector holder 8, and an operation unit 9.

Two bottom bases 2 are provided on the bottom surface of the housing 10 and are used for fixing the vehicle charge/discharge device 100 onto an installation surface, such as the ground. The number of the bottom bases 2 is not limited to two, and can be any number as long as the vehicle charge/discharge device 100 can be fixed onto an installation surface.

The front panel 3 is attached to cover a front surface of the housing 10. The operation unit 9 is provided on the front panel 3 and when the operation unit 9 is operated by a user, operations of driving and stopping the vehicle charge/discharge device 100, setting of the vehicle charge/discharge device 100, and the like can be performed.

Figure 2:
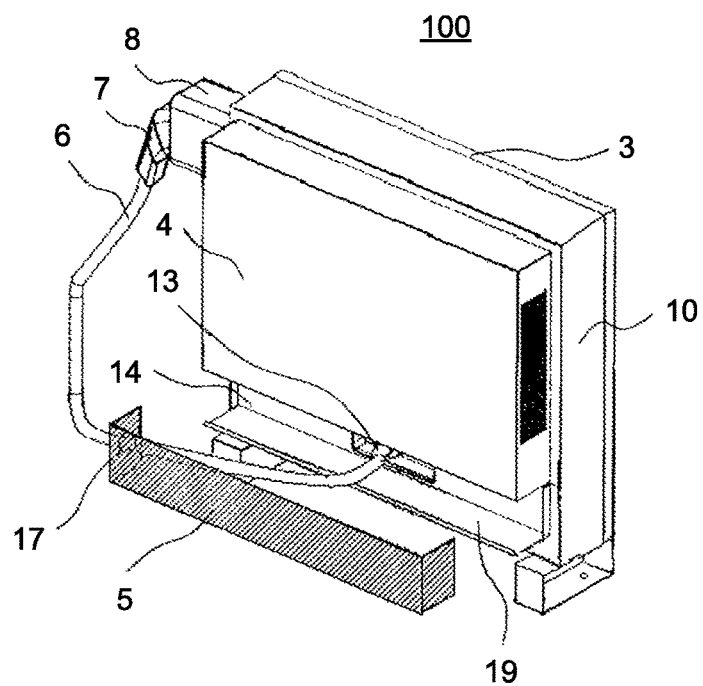
FIG. 2 is a rear perspective view of the vehicle charge/discharge device according to the first embodiment of the present invention.

As illustrated in FIG. 2, the rear cover 4 is a box-shaped frame and is attached to an upper portion of a rear surface of the housing 10. The rear cover 4 has a shape that is open in a surface that is in contact with the rear surface of the housing 10 and in a bottom surface. Note that the bottom surface of the rear cover 4 is not necessarily open. A first cable outlet 13 for allowing the cable 6 to pass therethrough is provided in a lower portion of the rear surface of the housing 10 below the rear cover 4. A rectangular member 19 is provided below the first cable outlet 13. The member 19 has a plate-like bottom portion that has a longer side of a rectangle along a horizontal direction and a shorter side of the rectangle along a depth direction of the vehicle charge/discharge device 100. The member 19 is attached to the rear surface of the housing 10.

The cable cover 5 has a shape in which a single metal plate is bent at a right angle toward the same direction at both ends, that is, a square U-shape. The perpendicularly bent portions at both ends form side-surface portions of the cable cover 5, and a single-plate portion forms a rear surface of the cable cover 5. The rear surface of the cable cover 5 extends in the horizontal direction.

The cable cover 5 is attached so as to cover the first cable outlet 13. At this time, the rear cover 4, the cable cover 5, and the member 19 are configured to be attachable to the rear surface of the housing 10 without any gap. A cable-accommodating room 14 is formed in a space surrounded by the cable cover 5 and the member 19 below the rear cover 4. The interior of the housing 10 and the cable-accommodating room 14 communicate with each other via the first cable outlet 13, and the cable-accommodating room 14 accommodates the cable 6 exiting from the first cable outlet 13.

The cable cover 5 is configured to be attachable to the rear surface of the housing 10 even when left and right as viewed from the front panel 3 side (hereinafter, "in front view") are reversed. Further, a second cable outlet 17 for allowing the cable 6 to pass therethrough is provided in either a left side surface or a right side surface of the cable cover 5 in front view. Therefore, when the cable cover 5 is attached to the rear surface of the housing 10 while reversing left and right of the cable cover 5 in front view, the position of the second cable outlet 17 is also switched from left to right. The present embodiment assumes that an electrically-driven vehicle (not illustrated) such as an electric vehicle (EV) or a plug-in hybrid electric vehicle (PHEV) is parked on a right side of the vehicle charge/discharge device 100 in front view. Therefore, in FIGS. 1 and 2, the second cable outlet 17 is provided on the right side in front view.

The connector 7 is provided at an end of the cable 6 and is a connector for being coupled to a power-transfer port (not illustrated) of an electrically-driven vehicle. By coupling the connector 7 to the power-transfer port (not illustrated), the electrically-driven vehicle (not illustrated) can perform a charging operation that supplies electric power from a commercial system (not illustrated) to a storage battery (not illustrated) of the electrically-driven vehicle via the vehicle charge/discharge device 100. Further, by coupling the connector 7 to the power-transfer port (not illustrated), it is possible to perform a discharging operation that supplies electric power from the storage battery (not illustrated) of the electrically-driven vehicle to a home appliance (not illustrated) that is a domestic load via the vehicle charge/discharge device 100.

The connector holder 8 is provided in such a manner that it can be attached on either a left side surface or a right side surface of the housing 10 in front view. While an electrically-driven vehicle (not illustrated) neither performs a charging operation nor a discharging operation, the connector 7 detached from the power-transfer port (not illustrated) of the electrically-driven vehicle is accommodated in the connector holder 8. The connector holder 8 is provided on the same side surface as the second cable outlet 17, and is attached to the right side surface of the housing 10 in front view in the present embodiment, as illustrated in FIG. 1.

Figure 3:
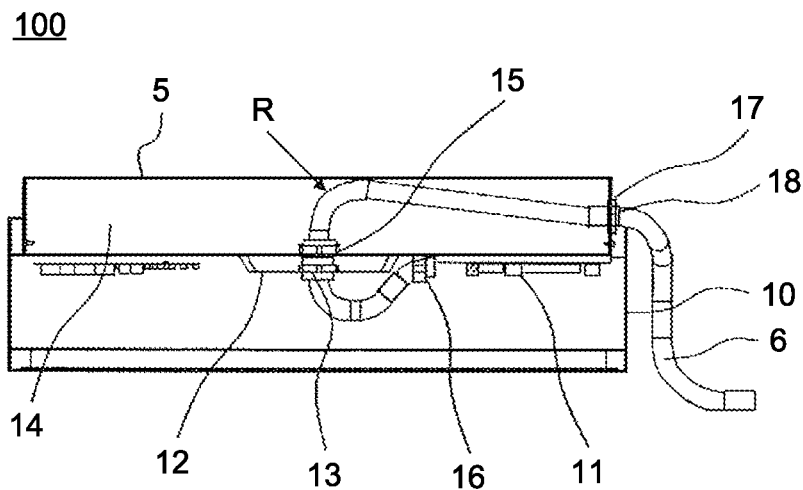
FIG. 3 is a top sectional view illustrating a method of laying a cable to be used in the first embodiment of the present invention.

Next, a method of laying the cable 6 is described. One end of the cable 6 is connected to the connector 7 and the other end is connected to an electronic circuit part 11 provided inside the housing 10 at the other end, as illustrated in FIG. 3. That is, the cable 6 serves as a charge/discharge path between a storage battery (not illustrated) of an electrically-driven vehicle and the electronic circuit part 11. The electronic circuit part 11 is connected to the cable 6 by using a screw, for example, so as to enable the cable 6 to be attached and detached easily.

The electronic circuit part 11 controls the vehicle charge/discharge device 100. Although not illustrated, the electronic circuit part 11 is connected to a commercial system (not illustrated) via a cable (not illustrated).

The cable 6 one end of which is connected to the connector 7 is provided so that the other end passes through the second cable outlet 17, as illustrated in FIGS. 2 and 3. A bush 18 made of silicone or rubber is provided in a gap between the second cable outlet 17 and the cable so as to protect the coating of the cable 6 from damage.

While the cable 6 is configured to be able to be pulled out from the second cable outlet 17 without any gap owing to the bush 18 provided in the second cable outlet 17, the bush 18 is formed to tighten the cable 6 in such a manner that the cable 6 is not fixed. Accordingly, the cable 6 can be inserted into and be pulled out from the second cable outlet 17 easily. With this configuration, when the cable cover 5 is detached to change the direction thereof, it is possible to smoothly attach the cable cover 5 without causing the cable 6 to be caught on the second cable outlet 17. Further, in a case where the length of the cable 6 from the second cable outlet 17 to a power-transfer port (not illustrated) of an electrically-driven vehicle is too long, it is possible to adjust the extra length of the cable 6 by bending the cable 6 inside the cable-accommodating room 14, for example, and to optimize the length of the cable 6 from the second cable outlet 17 to the power-transfer port (not illustrated) of the electrically-driven vehicle.

The cable 6 provided to pass through the second cable outlet 17, is further passed through the first cable outlet 13 via the cable-accommodating room 14. As illustrated in FIG. 3, a cable gland 15 is provided in the first cable outlet 13 to fill a gap between the first cable outlet 13 and the cable 6. While retaining the cable 6, the cable gland 15 protects it against water and dust so as to prevent entrance of rain water and dust into the housing 10.

The cable 6 arranged to pass through the first cable outlet 13 is connected to the electronic circuit part 11. The cable 6 between the electronic circuit part 11 and the first cable outlet 13 is fixed to the housing 10 by using a fixing bracket 16 so as not to be pulled out of the housing 10.

It is necessary to bend the cable 6 at a right angle when the cable 6 passes through the cable-accommodating room 14 from the first cable outlet 13 toward the second cable outlet 17, as illustrated in FIG. 3. At this bending, if the cable 6 is pressed by the cable cover 5 and a bending curvature becomes less than a defined minimum bending curvature R, disconnection may occur in the cable 6. Therefore, a concave portion 12 is provided in the rear surface of the housing 10 around the first cable outlet 13, which is concave toward the inside of the housing 10. By providing the concave portion 12, the distance in which the cable 6 can pass through in a depth direction of the housing 10 is increased and the bending curvature of the cable 6 is prevented from becoming smaller than the defined minimum bending curvature R, so that disconnection in the cable 6 is prevented.

Figure 4:
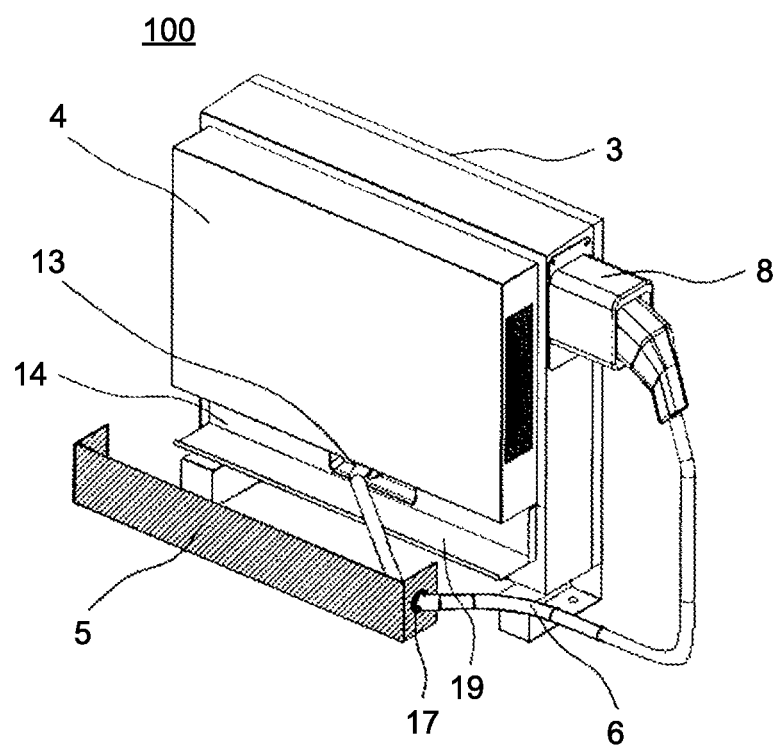
FIG. 4 is a rear perspective view illustrating a state where a cable cover used in the first embodiment of the present invention is detached.
Figure 5:
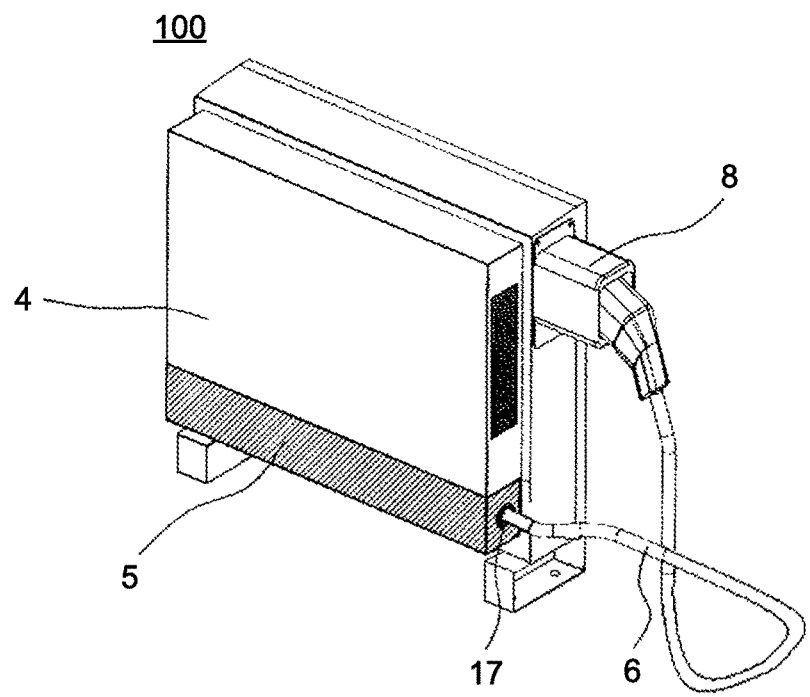
FIG. 5 is a rear perspective view illustrating a state where the cable cover used in the first embodiment of the present invention is attached.

Next, there is described a method of handling a case where an electrically-driven vehicle (not illustrated) is parked on the left side of the vehicle charge/discharge device 100 in front view in the present embodiment. First, the cable cover 5 is detached from the rear cover 4. As illustrated in FIG. 4, while the cable 6 remains passing through the second cable outlet 17, the direction of the cable cover 5 is turned to change the position of the fsecond cable outlet 17 to reverse left and right. At this time, the position of the connector holder 8 is also changed in such a manner that left and right are reversed. Thereafter, the cable cover 5 is attached to the rear cover 4 again, as illustrated in FIG. 5.

According to the first embodiment described above, the first cable outlet 13 is provided in a lower portion of a rear surface of the housing 10, and the second cable outlet 17 is provided to be attachable to face either left or right of the vehicle charge/discharge device 100 in front view. Therefore, it is possible to change the direction of the second cable outlet 17 easily.

Further, the first cable outlet 13 is provided at the center in the horizontal direction of the housing 10 in front view. With this configuration, it is possible to make the length of the cable 6 from the vehicle charge/discharge device 100 to a power-transfer port (not illustrated) of an electrically-driven vehicle the same, even if the direction of the cable cover 5 is changed and the second cable outlet 17 faces either left or right.

Further, by providing the connector holder 8 on the same side surface of the housing 10 as the second cable outlet 17, it is unnecessary to lay the cable 6 to extend in front of the vehicle charge/discharge device 100 to reach the opposite side, when the connector 7 is accommodated in the connector holder 8.

Furthermore, because the cable 6 is not fixed and is thus movable in the second cable outlet 17, the cable 6 is not caught in the second cable outlet 17 when the cable cover 5 is detached and the direction of the cable cover 5 is changed. Accordingly, it is possible to attach the cable cover 5 smoothly.

Further, because the cable 6 is not fixed and is thus movable in the second cable outlet 17, when the length of the cable 6 from the second cable outlet 17 to a power-transfer port (not illustrated) of an electrically-driven vehicle is too long, it is possible to adjust the extra length of the cable 6 by bending the cable 6 inside the cable-accommodating room 14, for example, and to optimize the length of the cable 6 from the second cable outlet 17 to the power-transfer port (not illustrated) of the electrically-driven vehicle.

While the cable cover 5 is configured as one component in which a left side surface and a right side surface in front view and a rear surface are integrated with one another in the present embodiment, the cable cover 5 may be configured by a plurality of individual members by separating the left side surface and the right side surface in front view and the rear surface from one another and the second cable outlet 17 may be provided on a side-surface member on one side only. Even with this configuration of the cable cover 5, it is possible to change the direction of the second cable outlet 17 easily.

Further, the cable gland 15 provided in the first cable outlet 13 and the bush 18 provided in the second cable outlet 17 may be reversed in the present embodiment. If the cable gland 15 and the bush 18 are reversed in this manner, identical advantageous effects are obtained although it is necessary to perform waterproofing and dustproofing between the rear cover 4 and the cable cover 5 and between the cable cover 5 and the member 19 by using a sponge or the like, provide a marginal length of the cable 6 between the first cable outlet 13 and the second cable outlet 17, and once loosen the cable gland 15 attached to the second cable outlet 17 when left and right of the cable cover 5 in front view are reversed.

While the cable cover 5 is open in an upper surface and a bottom surface in the present embodiment, the cable cover 5 may have a shape in which both the openings in the upper and bottom surfaces are closed. In this case, the member 19 is not required, and it is permissible that the rear cover 4 and the cable cover 5 are not in contact with each other, and the rear cover 4 is not provided. Further, the cable-accommodating room 14 is formed in a space surrounded by the cable cover 5. Even if the cable cover 5 has a shape in which both the openings in the upper surface and the bottom surface are closed in this manner, identical advantageous effects are obtained.

Second Embodiment

Figure 6:
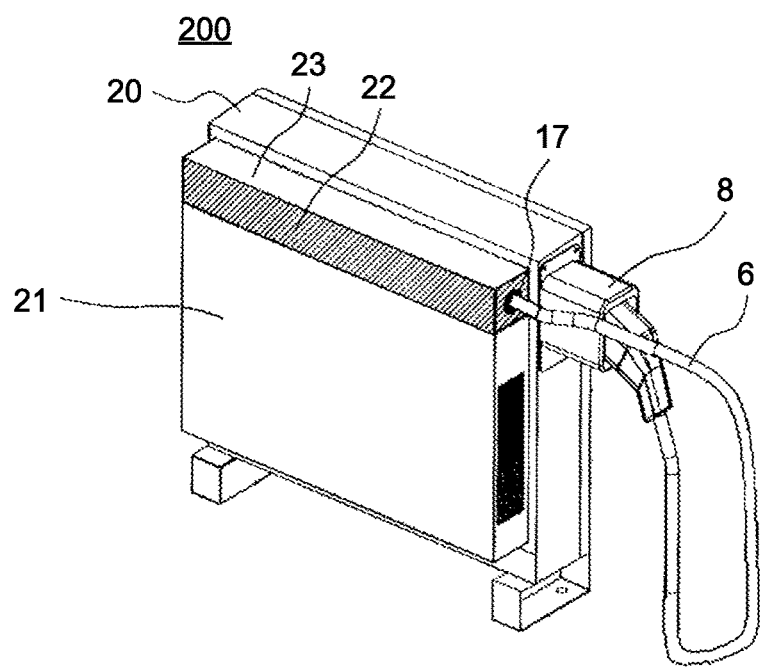
FIG. 6 is a rear perspective view of a vehicle charge/discharge device according to a second embodiment of the present invention.

A vehicle charge/discharge device according to a second embodiment of the present invention is described with reference to FIG. 6. In FIG. 6, reference signs same as those in FIGS. 1 to 5 indicate like or corresponding parts. While the vehicle charge/discharge device 100 according to the first embodiment includes the rear cover 4 on an upper portion of a rear surface of the housing 10 and the member 19 and the cable cover 5 below the rear cover 4, a vehicle charge/discharge device 200 according to the second embodiment includes a rear cover 21 on a lower portion of a rear surface of a housing 20 and a member 23 and a cable cover 22 above the rear cover 21. Except for the configuration described above, the second embodiment is the same as the first embodiment. Therefore, the method of laying the cable 6 and the method of handling a case where an electrically-driven vehicle (not illustrated) is parked on the left side of the vehicle charge/discharge device 200 in front view are the same as those in the first embodiment.

According to the second embodiment described above, identical advantageous effects to those in the first embodiment are obtained. Further, by providing the cable cover 22 on an upper portion of the housing 20, it is possible for a user to reverse left and right of the cable cover 22 in front view without bending forward, so that workability can be improved.

Third Embodiment

Figure 7:
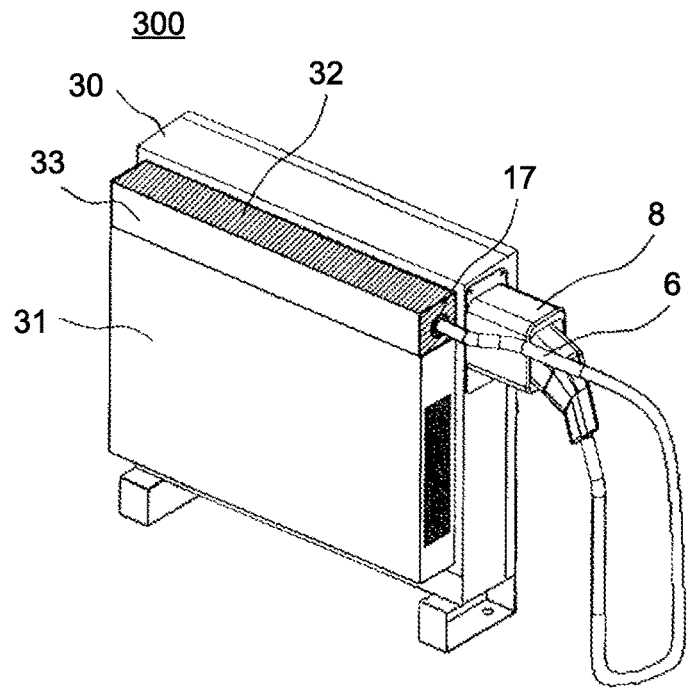
FIG. 7 is a rear perspective view of a vehicle charge/discharge device according to a third embodiment of the present invention.

A vehicle charge/discharge device according to a third embodiment of the present invention is described with reference to FIG. 7. In FIG. 7, reference signs same as those in FIGS. 1 to 6 indicate like or corresponding parts. The vehicle charge/discharge device 100 according to the first embodiment includes the rear cover 4 on an upper portion of a rear surface of the housing 10 and also includes the member 19 and the cable cover 5 below the rear cover 4, and the member 19 is provided to cover the bottom surface of a lower portion of the rear surface of the housing 10 and the cable cover 5 is provided to cover left and right side surfaces and a rear surface of the lower portion in the rear surface of the housing 10 in front view. Meanwhile, a vehicle charge/discharge device 300 according to the third embodiment includes a rear cover 31 on a lower portion of a rear surface of a housing 30 and also includes a member 33 and a cable cover 32 above the rear cover 31, and the member 33 is provided to cover a rear surface of an upper portion of the rear surface of the housing 30 and the cable cover 32 is provided to cover left and right side surfaces of the upper portion of the rear surface of the housing 30 in front view and a top surface of the housing 30.

The rear cover 31 and the member 33 may be integrated into one component. Although the cable cover 32 is configured as one component in which a top surface and left and right side surfaces are integrated with one another, the cable cover 32 may be configured by a plurality of individual members by separating the left side surface and the right side surface in front view and the top surface from one another, and the second cable outlet 17 may be provided on a side-surface member on one side member only. Except for the configuration described above, the third embodiment is the same as the first embodiment. Therefore, the method of laying the cable 6 and the method of handling a case where an electrically-driven vehicle (not illustrated) is parked on the left side of the vehicle charge/discharge device 300 in front view are the same as those in the first embodiment.

According to the third embodiment described above, identical advantageous effects to those in the first and second embodiments are obtained. Further, by providing the cable cover 32 to cover the left and right side surfaces in front view and the top surface of the upper portion of the rear surface of the housing 30, even if there is a wall or the like on the rear-surface side of the vehicle charge/discharge device 300, it is possible to reverse left and right of the cable cover 32 in front view without providing a space between the rear surface of the vehicle charge/discharge device 300 and the wall or the like. Therefore, workability can be improved.

Fourth Embodiment

Figure 8:
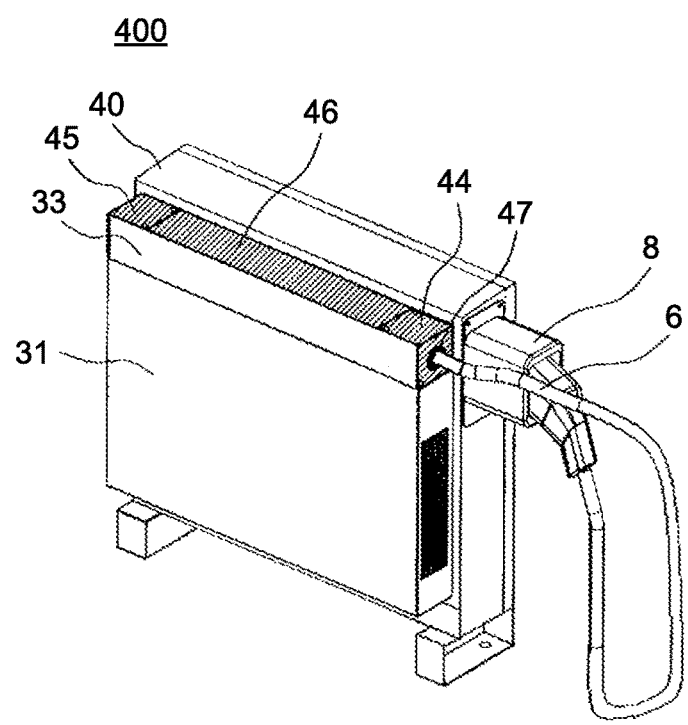
FIG. 8 is a rear perspective view of a vehicle charge/discharge device according to a modification of the third embodiment of the present invention.

A vehicle charge/discharge device according to a fourth embodiment of the present invention is described with reference to FIG. 8. In FIG. 8, reference signs same as those in FIGS. 1 to 7 indicate like or corresponding parts. In the vehicle charge/discharge device 300 according to the third embodiment, the cable cover 32 is configured as one component in which a top surface and left and right side surfaces are integrated into one. Meanwhile, in a vehicle charge/discharge device 400 according to the fourth embodiment, a cable cover is configured by three portions including an L-shaped first cable cover 44 having an opening in one surface, and an L-shaped second cable cover 45 and a third cable cover 46 that do not have an opening.

The first cable cover 44 is L-shaped, is attached to either a left side surface or a right side surface of the vehicle charge/discharge device 400 in front view, and is provided with a second cable outlet 47 in its side-surface portion. Further, the second cable cover 45 has the same shape as the first cable cover 44 and is attached to an opposite side surface to the first cable cover 44. However, the second cable cover 45 does not include the second cable outlet 47 in its side-surface portion. The first cable cover 44 and the second cable cover 45 can be attached even if the positions thereof are reversed.

The third cable cover 46 is for covering a portion other than the first cable cover 44 and the second cable cover 45, has a shape of a single plate, and is attached to a top surface of the vehicle charge/discharge device 400.

There is described a method of handling a case where an electrically-driven vehicle (not illustrated) is parked on the left side of the vehicle charge/discharge device 400 in front view while the vehicle charge/discharge device 400 is configured as described above. While all the first cable cover 44, the second cable cover 45, and the third cable cover 46 are detached and the cable 6 remains in the second cable outlet 47 of the first cable cover 44, the position of the first cable cover 44 and the position of the second cable cover 45 are reversed. At this time, the position of the connector holder 8 is also changed in such a manner that left and right are reversed. Thereafter, the third cable cover 46 is attached to its original position.

Figure 9:
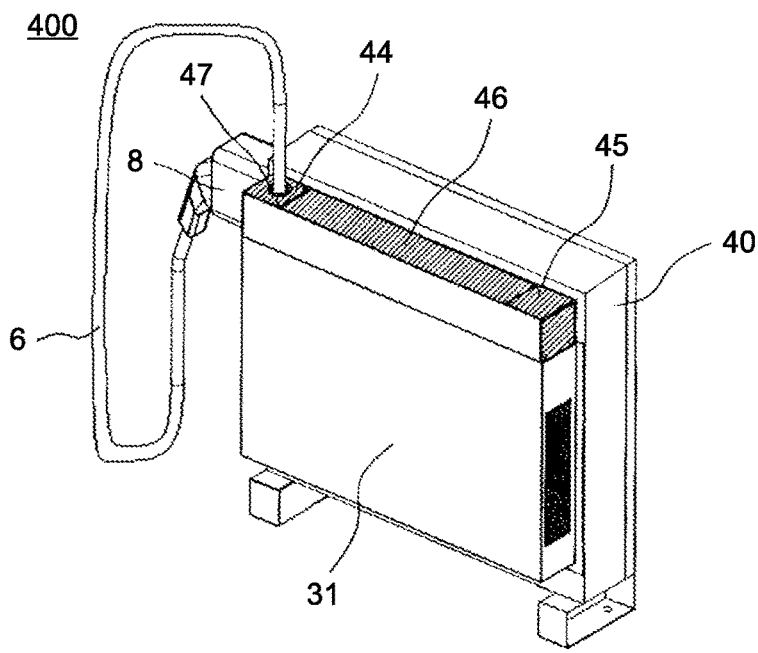
FIG. 9 is a rear perspective view at a timing when the position of a hole in a cable cover side-surface member used in the modification of the third embodiment of the present invention is changed.

As illustrated in FIG. 9, a side-surface portion and a top-surface portion of each of the first and second cable covers 44 and 45 may be configured to have the same shape as each other, that is, the first cable cover 44 may be configured to be attachable even if the side-surface portion and the top-surface portion are reversed, and the first cable cover 44 may be attached in such a manner that the second cable outlet 47 is located in a top surface when the position of the first cable cover 44 and the position of the second cable cover 45 are reversed.

According to the fourth embodiment described above, identical advantageous effects to those in the first to third embodiments are obtained, even if a cable cover is divided into three, that is, the first cable cover 44, the second cable cover 45, and the third cable cover 46. Further, because the first cable cover 44 and the second cable cover 45 are formed to be L-shaped, an opening direction of the second cable outlet 47 can be switched between side and top. Therefore, it is possible to realize a work of laying the cable 6 suitable for an installation place of a vehicle charge/discharge device.

Fifth Embodiment

Figure 10:
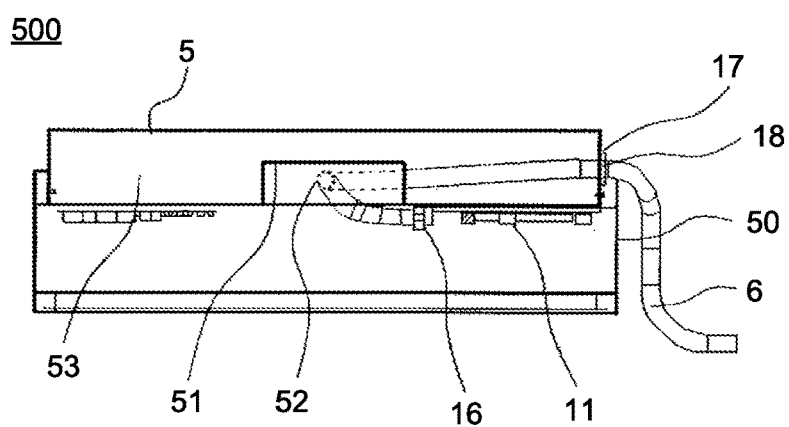
FIG. 10 is a top sectional view illustrating a method of drawing around a cable to be used in a fourth embodiment of the present invention.
Figure 11:
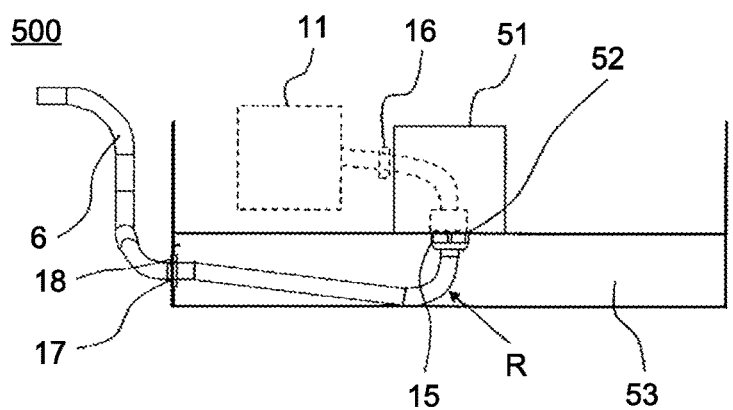
FIG. 11 is a rear sectional view of a lower portion of a vehicle charge/discharge device according to the fourth embodiment of the present invention.

A vehicle charge/discharge device according to a fifth embodiment of the present invention is described with reference to FIGS. 10 and 11. In FIGS. 10 and 11, reference signs same as those in FIGS. 1 to 9 indicate like or corresponding parts. While the first cable outlet 13 is provided in the concave portion 12 in a rear surface of the housing 10 in the vehicle charge/discharge device 100 according to the first embodiment, in a vehicle charge/discharge device 500 according to the fifth embodiment, a convex portion 51 is formed on a rear surface of a housing 50 and a first cable outlet 52 is provided in the convex portion 51.

The convex portion 51 is formed on the rear surface of the housing 50 to protrude from the inside of the housing 50 toward the outside of the housing 50. The convex portion 51 with a protruded shape toward the outside of the housing 50 is protruded sufficiently, and the first cable outlet 52 is provided in a bottom-surface portion of the protrusion to face a cable-accommodating room 53.

The interior of the housing 50 and the cable-accommodating room 53 communicate with each other via the first cable outlet 52 provided in the bottom-surface portion of the protrusion of the convex portion 51. Because in the second to fourth embodiments, a cable cover is provided on an upper portion of a rear surface of a housing, the first cable outlet 52 is provided in a top-surface portion of the protrusion of the convex portion 51.

Further, the cable gland 15 is provided in the first cable outlet 52 to fill a gap between the first cable outlet 52 and the cable 6. While retaining the cable 6, the cable gland 15 protects the housing 50 against water and dust so as to prevent entrance of rain water and dust to the inside of the housing 50. The cable 6 between the electronic circuit part 11 and the first cable outlet 52 is fixed to the housing 50 by using fixing metal fittings 16 not to be pulled out of the housing 50.

Except for the configuration described above, the fifth embodiment is the same as the first embodiment. Therefore, the method of laying the cable 6 and the method of handling a case where an electrically-driven vehicle (not illustrated) is parked on the left side of the vehicle charge/discharge device 500 in front view are the same as those in the first embodiment.

According to the fifth embodiment described above, identical advantageous effects to those in the first embodiment are obtained. Further, by providing the first cable outlet 52 in the bottom-surface portion or the top-surface portion of the convex portion 51 as illustrated in FIG. 11, it is possible to lay the cable 6 in a vertical direction in which there is a relatively large space, not in a depth direction in which the vehicle charge/discharge device 500 has to be made thin. Therefore, it is possible to lay the cable 6 without making a bending curvature thereof smaller than a defined minimum bending curvature R and to prevent disconnection in the cable 6.

Further, the first cable outlet 52 is provided at the center in the horizontal direction of the housing 50 in front view. With this configuration, it is possible to make the length of the cable 6 from the vehicle charge/discharge device 500 to a power-transfer port (not illustrated) of an electrically-driven vehicle the same, even if the direction of the cable cover 5 is changed and the second cable outlet 17 faces either left or right.

Sixth Embodiment

Figure 12:
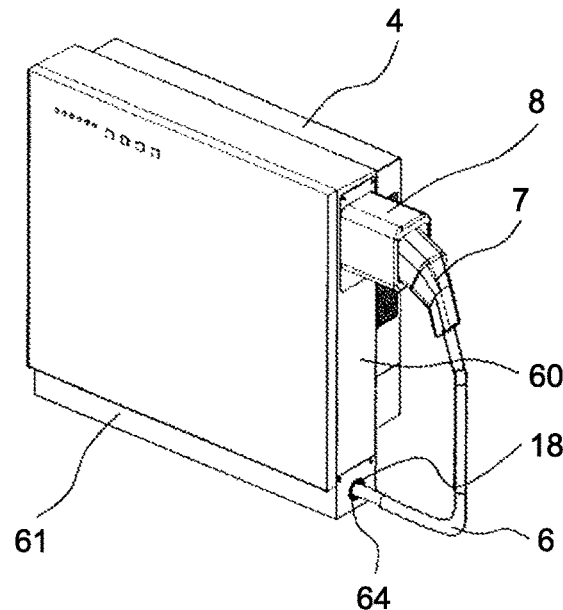
FIG. 12 is a front perspective view of a vehicle charge/discharge device according to a fifth embodiment of the present invention.
Figure 13:
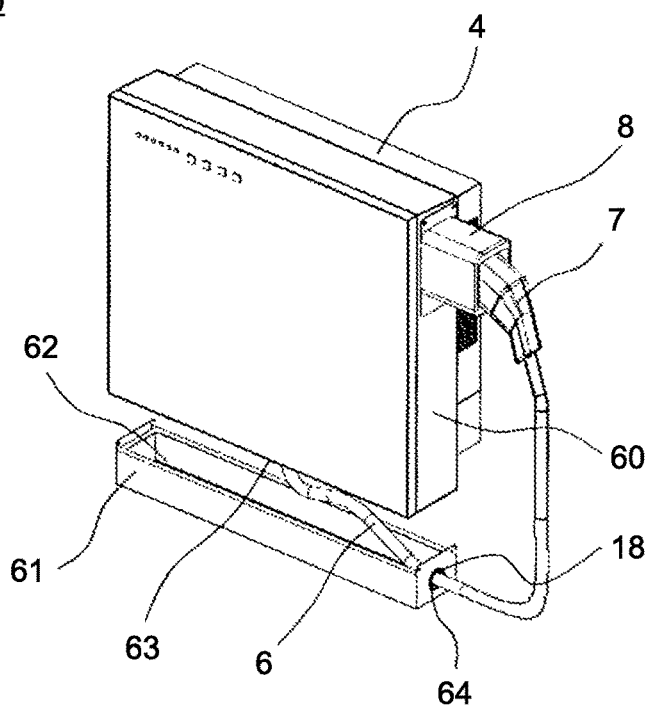
FIG. 13 is a front perspective view illustrating a method of drawing around a cable to be used in the fifth embodiment of the present invention.

A vehicle charge/discharge device according to a sixth embodiment of the present invention is described with reference to FIGS. 12 and 13. In FIGS. 12 and 13, reference signs same as those in FIGS. 1 to 11 indicate like or corresponding parts.

While the vehicle charge/discharge device 100 according to the first embodiment includes the bottom bases 2 on a bottom surface of the housing 10 and also includes the first cable outlet 13, the cable cover 5, and the member 19 in a lower portion of a rear surface of the housing 10, a vehicle charge/discharge device 600 according to the sixth embodiment does not include the bottom bases 2, the first cable outlet 13, the cable cover 5, and the member 19, but includes a first cable outlet 63 and a cable cover 61 in a bottom surface of a housing 60 and includes a cable-accommodating room 62 for accommodating the cable 6 in the cable cover 61. The first cable outlet 63 is provided to face the cable-accommodating room 62.

The cable cover 61 has a box-shape that is open in a top surface thereof, and has a second cable outlet 64 for allowing the cable 6 to pass therethrough in either a left side surface or a right side surface in front view. The cable cover 61 is configured to be attachable to a bottom surface of the housing 60 even if left and right in front view are reversed.

Next, a method of laying the cable 6 is described. One end of the cable 6 is connected to the connector 7 and the other end is connected to the electronic circuit part 11, similarly to the first embodiment. The electronic circuit part 11 is connected to the cable 6 by using a screw, for example, similarly to the first embodiment.

The cable 6 one end of which is connected to the connector 7, is provided so that the other end passes through the second cable outlet 64, as illustrated in FIGS. 12 and 13. The bush 18 is provided in a gap between the second cable outlet 64 and the cable 6, similarly to the first embodiment.

The cable 6 provided to pass through the second cable outlet 64, passes through the first cable outlet 63 via the cable-accommodating room 62. The cable gland 15 is provided in the first cable outlet 63, similarly to the first embodiment.

The cable 6 provided to pass through the first cable outlet 63 is connected to the electronic circuit part 11, similarly to the first embodiment.

Next, there is described a method of handling a case where an electrically-driven vehicle (not illustrated) is parked on the left side of the vehicle charge/discharge device 600 in front view in the present embodiment. First, the housing 60 is detached from the cable cover 61. As illustrated in FIG. 13, while the cable 6 remains passed through the second cable outlet 64, the direction of the cable cover 61 is turned to change the position of the second cable outlet 64 from left to right. At this time, the position of the connector holder 8 is also changed in such a manner that left and right are reversed. Thereafter, the housing 60 is attached above the cable cover 61.

According to the sixth embodiment described above, the first cable outlet 63 is provided in a bottom surface of the housing 60 and the second cable outlet 64 is provided to be attachable to face any of left and right of the vehicle charge/discharge device 600 in front view. Therefore, it is possible to change the direction of the second cable outlet 64 easily.

Further, the first cable outlet 63 is provided at the center in the horizontal direction of the housing 60 in front view. With this configuration, it is possible to make the length of the cable 6 from the vehicle charge/discharge device 600 to a power-transfer port (not illustrated) of an electrically-driven vehicle the same, even if the direction of the cable cover 61 is changed and the second cable outlet 64 faces either left or right.

Further, in the present embodiment, the cable gland 15 provided in the first cable outlet 63 and the bush 18 provided in the second cable outlet 64 may be reversed, similarly to the first embodiment. Even with this configuration, effects identical to those of the first embodiment can be obtained.

A vehicle charge/discharge device in each of the above first to sixth embodiments has been described as a vehicle charge/discharge device that performs a charging operation of supplying electric power from a commercial system (not illustrated) to a storage battery (not illustrated) of an electrically-driven vehicle via the vehicle charge/discharge device and performs a discharging operation of supplying electric power from the storage battery (not illustrated) of the electrically-driven vehicle to a home appliance (not illustrated) that is a domestic load via the vehicle charge/discharge device. However, the configuration of the vehicle charge/discharge device in each of the above first to sixth embodiments is the same both when the charging operation is performed and when the discharging operation is performed. Therefore, it is obvious that the vehicle charge/ discharge device is not necessary to include a discharge function of performing a discharging operation.

REFERENCE SIGNS LIST 10, 20, 30, 40, 50, 60 housing
5, 22, 32, 61 cable cover
6 cable
7 connector
8 connector holder
12 concave portion
13, 52, 63 first cable outlet
17, 47, 64 second cable outlet
44 first cable cover
45 second cable cover
46 third cable cover
51 convex portion

The invention claimed is:

1. A vehicle charge/discharge device, comprising:
a housing;
a cable to serve as a charge/discharge path between a storage battery of an electrically-driven vehicle and an electronic circuit part provided in the housing;
a first cable outlet provided in the housing to allow the cable connected to the electronic circuit part to pass therethrough;
a cable cover having an elongated shape extending in a horizontal direction, being attached to the housing to cover the first cable outlet, and being attachable to the housing even when the left side and the right side in the front view of the housing are reversed; and
a second cable outlet provided on either a left-area surface or a right-area surface of the cable cover in front view to allow the cable which is provided to pass through the first cable outlet from the electronic circuit part, to pass therethrough.

2. The vehicle charge/discharge device according to claim 1, further comprising:
a connector provided at an end of the cable and coupled to a power-transfer port of the electrically-driven vehicle; and
a connector holder to accommodate the connector and be attachable to any of a left side surface and a right side surface of the housing in the front view of the housing, wherein
the connector holder is attached to the same side surface of the housing as the second cable outlet.

3. The vehicle charge/discharge device according to claim 1, wherein the first cable outlet is provided in a rear surface of the housing.

4. The vehicle charge/discharge device according to claim 1, wherein the cable cover is configured by one component in which left and right side surfaces in the front view of the housing and a rear surface are integrated with one another.

5. The vehicle charge/discharge device according to claim 1, wherein left and right side surfaces in the front view of the housing and a rear surface of the cable cover are configured by a plurality of individual members.

6. The vehicle charge/discharge device according to claim 1, wherein the cable cover is provided in a lower portion of a rear side of the housing.

7. The vehicle charge/discharge device according to claim 1, wherein the cable cover is provided in an upper portion of a rear side of the housing.

8. The vehicle charge/discharge device according to claim 1, wherein the cable cover is provided in an upper portion of a rear side of the housing and is configured by one component in which left and right side surfaces in the front view of the housing and a top surface are integrated with one another.

9. The vehicle charge/discharge device according to claim 1, wherein the cable cover is provided in an upper portion of a rear side of the housing and left and right side surfaces in the front view of the housing and a top surface of the cable cover are configured by a plurality of individual members.

10. The vehicle charge/discharge device according to claim 9, wherein
the cable cover is configured by a first cable cover having an L-shape and having a second cable outlet in either a left side surface or a right side surface in the front view of the housing, a second cable cover having a same shape as the first cable cover and having no second cable outlet, and a third cable cover having a shape of a single plate, and
the first cable cover and the second cable cover are attachable to the housing even when positions of the first and second cable covers are reversed.

11. The vehicle charge/discharge device according to claim 10, wherein the first cable cover is able to be attached even when its side surface in the front view of the housing and a top surface are reversed.

12. The vehicle charge/discharge device according to claim 1, wherein a concave portion that is concave toward inside of the housing is provided around the first cable outlet.

13. The vehicle charge/discharge device according to claim 1, wherein a convex portion is provided on a rear surface of the housing, which is formed by protruding toward an outside direction of the housing and is provided with the first cable outlet in a bottom surface or a top surface of a protrusion protruded toward the outside direction of the housing.

14. The vehicle charge/discharge device according to claim 1, wherein
the first cable outlet is provided in a bottom surface of the housing, and
the cable cover has a box-shape that is open in a top surface, and is attached to a bottom surface of the housing.

15. The vehicle charge/discharge device according to claim 1, wherein the first cable outlet is provided at a position located at a center in a horizontal direction of the housing in the front view of the housing.

* * * * *